United States Patent [19]

Benson

[11] Patent Number: 4,828,319
[45] Date of Patent: May 9, 1989

[54] VEHICULAR SUN SHIELD

[76] Inventor: Lawrence A. Benson, 2215 Daffodil Dr., Pittsburg, Calif. 94565

[21] Appl. No.: 101,364

[22] Filed: Sep. 25, 1987

[51] Int. Cl.$^4$ ............................................. B60J 11/00
[52] U.S. Cl. ..................................... 296/136; 296/98; 160/23.1
[58] Field of Search ......................... 296/98, 136, 1 R; 160/23 R

[56] References Cited

U.S. PATENT DOCUMENTS 2,638,378  5/1953  Molinaro ............................. 296/136

FOREIGN PATENT DOCUMENTS 354610   6/1922  Fed. Rep. of Germany ........ 296/98
3207134  9/1983  Fed. Rep. of Germany ........ 296/98

Primary Examiner—Robert R. Song
Attorney, Agent, or Firm—Leon Gilden

[57] ABSTRACT

A sun shield for protecting automotive interiors during periods of non-use is provided. A spring biased roll apparatus provides a normally retracted orientation of the sun shield whereby manual grasping enables extending and covering of the automotive interior by securement members including spring loaded plungers to engage opposed sides of a forward portion of an automobile. Clasp means are additionally provided at forward portions of the unfurled core for engagement with associated attachment means positionable on the automotive dash board. Additionally, the vehicular sun shield is zippered medially of its length for selective shielding of either longitudinal half of said automotive interior.

5 Claims, 1 Drawing Sheet

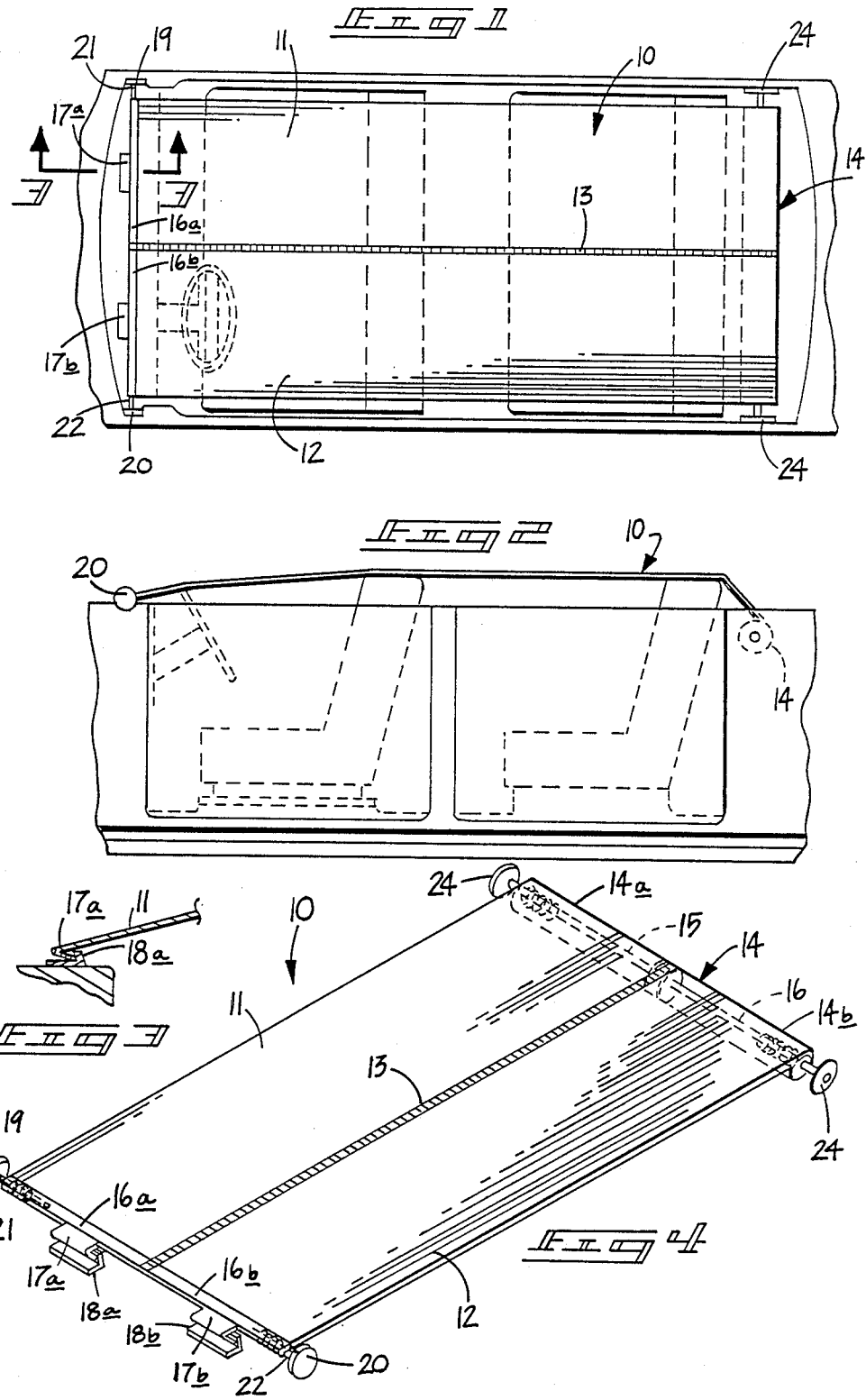

VEHICULAR SUN SHIELD

BACKGROUND OF THE INVENTION

1. Field of the Invention

The present invention relates to sun shielding devices and more particularly pertains to a new and improved automotive interior sun shield which, when not being utilized, may be compactly stored rearwardly of the associated automobile and may more particularly and selectively shield either interior half, as desired.

2. Description of the Prior Art

The use of automotive sun shielding apparatus is well known in the prior art. As may be appreciated, these devices have usually required a substantial amount of space and were of cumbersome construction that resisted utilization thereof. In this connection, there have been several attempts to develop automotive sun shields which may be easy and efficiently stored when not in use and selectively implemented as needed. For example, U.S. Pat. No. 890,875 to Samuel sets forth a wind-up storage magazine attached rearwardly of an automobile utilizing a windlass arrangement for winding of the storage drum, and an associated hook for attachment of the field at a mid-point of the automobile to provide covering for a rear portion of said automobile. While a functional solution for providing covering for a rear half portion of an automobile, the Samuel shield is not particularly adaptable for interior automotive use nor is it easily retracted or extended when needed.

U.S. Pat. No. 1,169,927 to Collier provides an attachable curtain positionable over open-top automobiles wherein supporting flexible springs are securable about a forwardly positionable roller to furl an extendable covering when desired. The organization is pivotal about medially securable strips into an automobile and thereby fails to provide a conveniently storable organization that is visually removed from the passenger compartment when not in use and furthermore fails to provide selective coverings of either longitudinal section half of an automobile, as does the present invention.

Another vehicular covering apparatus of interest is to be found in U.S. Pat. No. 1,950,927 to McMillan illustrating a cover for a rear section of a convertible-type automobile wherein the cover magazine supply is positioned at a mid-point of said automobile body and oriented rearwardly to cover that particular portion of the automobile. While of general interest in the development of such covers for vehicles, the particular shield fails to provide for complete interior coverage and furthermore does not present a means for compactly storing a covering section at a remote portion of an automobile when not in use and then further fails to set forth means for selectively covering longitudinal halves of a vehicle's interior.

U.S. Pat. No. 2,028,209 to Hart provides a covering curtain of a type found in the prior art wherein a spring biased core retracts a curtain extended and secured by telescoping rods to cover selective sections of an automobile but is generally of a class of invention as described above with similar shortcomings in relation to selective shielding of the interior of an automobile.

U.S. Pat. No. 3,075,805 to Gold provides an automotive sun blind secured to a core formed within an articulating center portion to accommodate the curvature of vehicular interior and thus particularly form sliding sun panels. The limited application of this invention and its shortcomings is consistent with the prior art and further fails to provide a solution to the problem of providing a sun shield that is conveniently retracted at a rearward-most portion of an automobile during periods of nonuse and is furthermore easily withdrawn and secured to such automobile when desired and further providing means for selective covering of lateral longitudinal sections of an automobile.

As such, it may be appreciated there is a continuing need for a new and improved automotive sun shield device which addresses both the problem of storage and selective utilization, and in this respect, the present invention substantially fulfills this need.

SUMMARY OF THE INVENTION

In view of the foregoing disadvantages inherent in the known types of vehicular sun shields now present in the prior art, the present invention provides a vehicular sun shield wherein the same may be compactly stored when not in use and may be further easily and efficiently divided about the longitudinal center of an automobile's interior. As such, the general purpose of the present invention, which will be described subsequently in greater detail, is to provide a new and improved vehicular sun shield which has all the advantages of the prior art vehicular shields and none of the disadvantages.

To attain this, the present invention comprises a flexible, retractable and extendable sun shield removable from a normally resiliently biased spring wind-up roll wherein the sun shade is positionable over the passenger compartment of a vehicle. The sun shade is provided with resiliently expandable securement means positionable at either end of a forwardmost rigid elements of said flexible shield. Clasp means are formed about either medial linear portion of the sun shield securable to the automobile's dashboard. A zipper formed medially of the longitudinal dimension of the sun shield may be unzipped to enable selective covering of either side of said passenger compartment.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular sun shield which has all the advantages of the prior art vehicular sun shields and none of the disadvantages.

It is another object of the present invention to provide a new and improved vehicular sun shield which may be easily and efficiently manufactured and marketed.

It is a further object of the present invention to provide a new and improved vehicular sun shield which is of a durable and reliable construction.

An even further object of the present invention is to provide a new and improved vehicular sun shield which is susceptible of a low cost of manufacture with regard to both materials and labor, and which accordingly is then susceptible of low prices of sale to the consuming public, thereby making such vehicular sun shield economically available to the buying public.

Still yet another object of the present invention is to provide a new and improved vehicular sun shield which provides in the apparatuses and methods of the prior art some of the advantages thereof, while simultaneously overcoming some of the disadvantages normally associated therewith.

Still another object of the present invention is to provide a new and improved vehicular sun shield compactly stored when not in use about a spring biased wind-up core.

Yet another object of the present invention is to provide a new and improved vehicular sun shield wherein either side of a longitudinal extent of the vehicular sun shield is utilized by means of a zippered connection therebetween.

Even still another object of the present invention is to provide a new and improved vehicular sun shield wherein resiliently biased grasping means formed of relatively resilient materials are engageable with a forward portion of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its use, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the present invention illustrating the vehicular sun shield in its extended orientation.

FIG. 2 is a side orthographic view of the invention of FIG. 1.

FIG. 3 is a side orthographic view of the invention partially in section taken along the lines 3—3 in the direction indicated by the arrows of FIG. 1.

FIG. 4 is an isometric view illustrating the vehicular sun shade, its configuration, its various elements, and their relationship.

DESCRIPTION OF THE PREFERRED EMBODIMENT

With reference now to the drawings, and in particular to FIG. 1 thereof, a new and improved vehicular sun shield embodying the principles and concepts of the present invention and generally designated by the reference numeral 10 will be described.

More specifically, it will be noted that the vehicular sun shield apparatus 10 essentially comprises a first longitudinal side 11 and a second longitudinal side 12 formed with a medially positioned zipper member 13. A normally biased furling core 14 is positionable within a recessed portion of an associated automobile. Biased furling core 14 is formed of a first furling core 14a and a second furling core 14b coaxially associated and positioned by means of a centrally positioned axial furling core rod 15. Each furling core 14a and 14b are normally biased into a furled position by means of respective spring means, such as tortional springs as are commonly utilized by such spring windup rollers or cores. Ancillary structure enabling and effecting the positioning the furling core 14 includes such elements as bearings 24 to secure and enable winding of said core. Secured at forward ends of first longitudinal side 11 and second longitudinal side 12 are respective first and second forward rib elements 16a and 16b. Secured to forward portions, as best illustrated in FIG. 4, are first and second respective hook portions 17a and 17b interengageable with respective first and second clasp receivers 18a and 18b illustrated in FIG. 3. Secured to respective terminal exterior end portions of first and second rib members 16a and 16b are first and second resilient gripper cup members 19 and 20 engageable at a forwardmost portion of an associated automobile normally securable within such elements as trim strips about a windshield. The first and second gripper cup members 19 and 20 are normally extensible and biased outwardly of said rib elements by means of gripper cup coil extension springs 23 formed within said respective rib elements about first and second gripper cup axles 21 and 22 to normally bias said gripper cup members 19 and 20 into their extended position, as illustrated in FIG. 1.

As to the manner of usage and operation of the present invention, the same should be apparent from the above description. However, to further clarify the operation a brief description will be set forth.

When a user is desirous of protecting the interior of a vehicle from the normal exposure to sun, he merely extends the sun shield 10 from its retracted position about furling core 14 and by means of gripper cups 19 and 20 positions them forwardly of molding or chrome present about windshields whereby the sun shield is in a forward protective position, as illustrated in FIG. 1. Additionally, first and second hook portions 17a and 17b respectively are engageable with first and second clasp portions 18a and 18b to further anchor the sun shield if desired but more importantly, should a user desire to merely withdraw the second longitudinal side portion 12 and allow first longitudinal side portion 11 to remain in position, he may merely retract zipper 13 to disengage second longitudinal side portion 12 from first longitudinal side portion 11 and enable portion 12 to be withdrawn about its respective furling core 14b. Alternatively, should a passenger desire to utilize the passenger compartment while waiting, a similar approach is utilized with respect to furling first longitudinal side 11 with respective second longitudinal side 12, as outlined above.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular sun shield coextensively positionable over the seat portion of a vehicle wherein said vehicle includes a rear portion, a seat portion, and a forward dashboard portion forwardly of said seat portion wherein said sun shield comprises,
   a sun shield means coextensively positionable from the rear portion of said automobile over said seat portion and securable relative to said forward portion, and
   furling core means normally bias said sun shield to a furled position, and
   securing means for securing said sun shield proximate said dashboard, and
   wherein said sun shield is formed of first and second longitudinal portions including means to selectively secure said first and second longitudinal portions together along their length, and
   including securement means for securing said first and second longitudinal portions to said dashboard, and
   wherein said furling core means includes first and second furling cores for
   selective furling of either of said first and second longitudinal portions.

2. A vehicular sun shield as set forth in claim 1 wherein said first and second longitudinal portions have secured thereto at their forwardmost position first and second forward rib elements secured to respective first and second longitudinal portions.

3. A vehicular sun shield as set forth in claim 2 wherein said first and second forward rib portions have formed at a forwardmost edge thereof first and second hook elements respectively engageable with first and second clasp portions securable to said dash for engagement with respective of said first and second hook portions.

4. A vehicular sun shield as set forth in claim 3 wherein said first and second forward rib portions have positioned at terminal outermost ends thereof first and second gripper cup means for engagement with a forward portion of said vehicle proximate said dashboard.

5. A vehicular sun shield as set forth in claim 4 wherein said first and second gripper cup means are normally biased outwardly by means of gripper cup coil extension springs.

* * * * *